United States Patent [19]

Pielkenrood

[11] 4,028,256
[45] June 7, 1977

[54] SEPARATION DEVICE

[75] Inventor: Jacob Pielkenrood, Krommenie, Netherlands

[73] Assignee: Pielkenrood-Vinitex N.V., Assendelft, Netherlands

[22] Filed: Oct. 22, 1975

[21] Appl. No.: 624,703

Related U.S. Application Data

[63] Continuation of Ser. No. 427,291, Dec. 21, 1973, abandoned, which is a continuation of Ser. No. 146,201, May 24, 1971, abandoned.

[30] Foreign Application Priority Data

May 24, 1970 Netherlands ............. 7007498

[52] U.S. Cl. .......................... 210/519; 210/522
[51] Int. Cl.² ............................ B01D 21/00
[58] Field of Search ............. 210/519, 521, 522; 209/155, 157; 55/440, 464

[56] References Cited

UNITED STATES PATENTS

| 2,673,451 | 3/1954 | Gariel | 210/521 X |
| 3,346,122 | 10/1967 | Cornelissen | 210/522 |
| 3,456,798 | 7/1969 | Urdanoff | 210/519 X |
| 3,552,554 | 1/1971 | Olgard | 210/519 |

FOREIGN PATENTS OR APPLICATIONS

| 1,098,155 | 7/1955 | France | 210/521 |

*Primary Examiner*—Frank W. Lutter
*Assistant Examiner*—William A. Cuchlinski, Jr.
*Attorney, Agent, or Firm*—George F. Smyth

[57] ABSTRACT

A device for separating floating or precipitating components from a liquid comprising a number of substantially parallel inclined passages between superposed partitions, and provided with additional mutually parallel guiding baffles at least at one extremity of this assembly for guiding the liquid and/or separated components towards the effective part of these passages without restricting the cross-section of the assembly. One or more slotted baffles transversely to these guiding baffles may improve the uniformity of the supplied liquid flow, and the latter may also be supplied by means of a slotted supply duct which is directed transversely to the guiding baffles.

22 Claims, 12 Drawing Figures

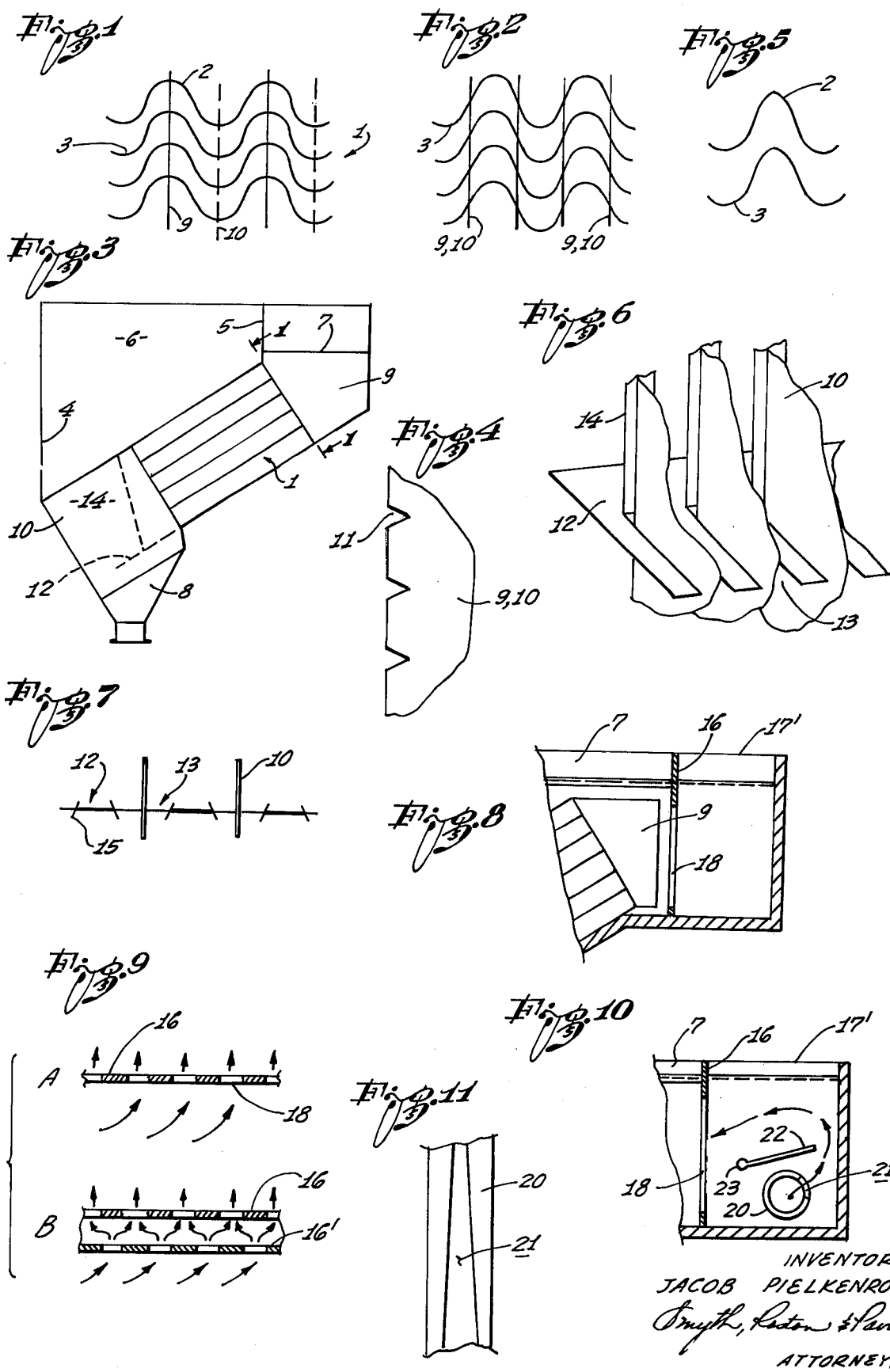

SEPARATION DEVICE

This application is a continuation of U.S. application Ser. No. 427,291, filed Dec. 21, 1973, and now abandoned, which U.S. application was a continuation of U.S. application Ser. No. 146,201, filed May 24, 1971, also abandoned.

BACKGROUND OF THE INVENTION

The invention relates to a device for separating light (i.e., floating) and/or heavy (i.e., precipitating) components from a liquid, comprising an assembly of substantially superposed partitions such as plates all extending, in the direction of flow. The plates provide either upward or downward sloping separating passages or channels, and at least at one extremity of these channels, means are provided to direct the components separated from the liquid to a collecting chamber.

From the Netherlands patent application No. 65/11 823, corresponding to U.S. Pat. No. 3,346,122, a device is known in which partitions of separating passages are formed by corrugated plates. The guiding devices comprise U-shaped discharge channels, the edges of which engage with the transitions between corresponding adjoining crests or tops and valleys such that the interior spaces of the discharge channels connect at one extremity of the assembly with the passages between superposed crests. At the same extremity, the passages between valleys, i.e., between two adjoining discharge channels, remain free.

In this manner, components floating just below the crests, and/or components precipitating in the valleys of the passages, may be kept substantially separated from the supply and the discharge flow of liquid at the extremities of the plate assembly, thus avoiding re-mixing caused by turbulence.

A disadvantage of such discharge channels is that, at the respective extremity, the total flow passage of the assembly is reduced to about one-half of the total sectional area. This may be especially disadvantageous at the supply end, since the separation effect will only fully occur at some distance behind the entry, the flow has diverged sufficiently to fill the cross-section of the assembly completely. Thus, the effective length of the assembly is considerably reduced. Furthermore, when the separation is such that a crest or a valley does not fill completely with a floating or a precipitating component, respectively, a flow of carrying liquid will also exist in the channels which must also be discharged.

SUMMARY OF THE INVENTION

In some cases, a simplification of such devices appears possible without harming the operating effect. This invention provides such a simplified device in which the guiding means consist of baffles directed substantially parallel to each other and transverse to the partitions of the separating passages.

It has appeared in fact that, in many cases, the separated components show such an adhesion towards these baffles that sufficient guidance of these dischargeable components with respect to the enveloping liquid is obtained. On the other hand, it may be that the velocity gradient existing near such a baffle provides a certain guiding effect on the separated components, in particular heavy components precipitating along such a baffle, whereas, in other cases, guidance in an open channel between such baffles instead of in a closed discharge channel may often be sufficient.

In one first case the baffles maybe positioned in such a manner that they are in contact with the partitions in the curves of tops (i.e., crests) or valleys. This may also be practicable in a second case as the baffles may tend to suppress turbulences in the flow, whereas it is then also possible to connect these baffles to the partitions in the transition between adjoining tops and valleys. In either case, the total flow passage is hardly restricted.

In particular, these baffles may be considered as supports and/or spacers of the partitions, for which purpose these baffles are preferably provided with symmetrical V-shaped notches so that they can be used in any position.

When it is desired to use such baffles to support the partition plates in the curve of tops and/or valleys, partition plates or troughs having a slope on either side of the curve in excess of 45° may be utilized. When support is to be accomplished on either side of the tops or crests, using such notched baffles or supports, such steep slope angles may not be possible. Such slope angles promote, however, a good separation.

In particular, it may be preferred that the tops and valleys be of different widths in order to obtain a reduction of the friction along the face of the partition (for instance for a floating component) or an increase of the flow passage (for instance for a precipitating component).

When necessary, the interstices between such baffles may be partly closed off at the discharge end by means of a comb-shaped plate in order to suppress turbulence which leads to re-mixing of separated components. The flow distribution at the entry of a separation assembly utilizing this invention, may be improved by means of an additional slotted baffle, if desired and by means of a special supply pipe providing a uniform distribution of the liquid.

The invention will now be elucidated by reference to the drawings, showing in:

FIGS. 1 and 2, diagrammatical front views of separation assemblies consisting of corrugated plates with different arrangements of the guide baffles according to the invention;

FIG. 3, a simplified cross-section through a separating device with such baffles;

FIG. 4, a part plan view on a larger scale of such a baffle;

FIG. 5, a particular embodiment of a plate assembly to be supported with such a baffle;

FIG. 6, an isometric view of a number of baffles with an additional guide plate;

FIG. 7, a front view of a different embodiment of such a guide plate;

FIG. 8, a partial cross-section of one extremity of a modified embodiment of the device of FIG. 3;

FIGS. 9A, and B, diagrammatical cross-sections of two different slotted baffles for the device of FIG. 8;

FIG. 10, a partial cross-section corresponding with FIG. 8 with modified liquid supply means; and FIG. 11, a partial top view of the liquid supply tube of the device according to FIG. 10.

The plate assembly shown in FIGS. 1 and 2 comprises a number of corrugated plates 1 with crests or tops 2 and valleys 3. When, as shown in FIG. 3, such an assembly is placed on an angle in a container 4, divided by a cross partition 5 into two chambers 6 and 7, an upward flow can be provoked in the assembly 1 when chamber 6 acts as supply chamber, whereas a downward flow is provoked therein when chamber 7 is the supply chamber.

When the liquid which flows through the assembly contains light (i.e., floating) components, these will collect under the tops 2 of the plates 1, whereas heavy (i.e., precipitating) components will collect in the valleys 3. As a result of the slanting position of the assembly, the floating components will move upwardly to chamber 7, and the precipitating components will move downwardly to a sedimentation chamber 8 communicating with chamber 6. The former components will float on top of the liquid in chamber 7, whereas the latter can be discharged at the bottom end of chamber 8. The sense of flow in the assembly 1 depends, therefore, on the predominant component to be separated as this is, preferably, separated in counterflow to the direction of fluid motion.

In FIG. 1, baffles 9 are shown which interconnect superposed crests or tops of the baffle 9. These plates are situated, for instance as shown in FIG. 3, in the floatation chamber 7 and they may extend across the full length thereof. It has appeared that many floating components, for instance oil to be separated from water, have a tendency to move upwardly along such baffle surfaces in the flotation chamber 7 after having left the tops of the passages between the plates or sheets 1. Such baffles then form guides for such floating components while occupying very little space and thus not restricting the flow of the carrying liquid (or, when chamber 7 is the supply chamber, the liquid to be treated). At the other extremity of the assembly, in chamber 6, similar baffles may be provided, or, as shown, baffles 10 can be positioned which engage with the plates 1 in the valleys 3.

In some cases the adhesion to such baffles may be less strong. It may then be advisable to arrange the baffles as shown in FIG. 2, wherein they are illustrated as being in contact with the plates 1 in the transition between the tops 2 and the adjoining valleys 3. These baffles then may suppress turbulence and guide the separated components along the plates more smoothly.

FIG. 4 shows a portion of preferential shape of an extremity of such a baffle 9 or 10. In this case the edge which shall be in contact with the plates 1 is provided with V-shaped and, preferably, symmetrical notches. When these notches are symmetrical such baffles do not show a preferential direction, allowing a simplification of the assembly.

As mentioned, separation of heavy (i.e., precipitating) components to the valleys 3 and/or light (i.e., floating) components to the tops 2 occurs during the flow of a liquid to be treated through the passages between the plates of assembly 1. This separation effect can be improved by forming the channels which connect the tops and the valleys with relatively steep sides. Such a configuration of the passages, moreover, may be employed to aid in preventing remixing of the separated components with the liquid. For the customary plate assemblies, supported in the transitions between tops and valleys as shown in FIG. 2, the steepness of the slope is limited when supporting has to be accomplished exclusively with notched baffles or similar supports, otherwise, the transverse forces on the baffles and on the plates at the support points may become excessive. Therefore, it may be considered necessary that the plates 1, and also the guide baffles be manufactured from a lightweight flexible plastic. When, however, the supporting is arranged as shown in FIG. 1, no difficulties usually occur, so that slopes of more than 45° are possible for the channel transitions between tops and valleys.

FIG. 5 shows yet another particular embodiment of corrugated plates with steep sloping sides wherein the tops 2 are narrower than the valleys 3. When the tops are narrow, the particle contact surface area of the plate 1 will be smaller for the same quantity of floating components than with a larger top. Thus, the friction will be less promoting a smooth discharge of this component. For precipitating components, on the other hand, a broad valley may be advantageous in order to avoid blockage at the discharge end. By forming the plates in the manner of FIG. 5 both requirements can be fulfilled, whereas, at the same time, a more nearly sloped side wall can be obtained; furthermore the interstices between these transitions can be considerably narrower than between the tops and valleys of FIG. 1, for example, so that the contact surface where re-mixing may occur is reduced.

It may sometimes be necessary with such baffles to suppress turbulence in the enveloping flow of liquid at the point where the separated component leaves the assembly 1. Adequate accessories for this purpose are shown in FIGS. 6 and 7. A first accessory is a comb-shaped plate 12, shown in FIG. 3 in dotted lines for the case of a precipitating component, in which case this plate connects to the underside of the plate assembly 1 with the extremities of the teeth baffles 10 may then be shorter and positioned symmetrically in the interstices 13 of plate 12. The teeth of plate 12 increase the flow resistance for the liquid between the baffles 10 in such a way that the liquid is forced to the tops of the passages of the assembly 1. In the case of a light (i.e., floating) component, a similar plate can be placed in chamber 7 near the top of the assembly 1. These plates correspond with a plate described in a previous Netherlands patent application No. 69/17 229, corresponding to U.S. Pat. No. 666,111. The baffles may, in this case, continue to the outer edge of the interstice 13 or they may be situated at some distance thereof.

In order to suppress, as far as possible, the inflow of the liquid to be treated into the passages of the assembly 1 in the vicinity of the baffles 10, additional guide plates 14, substantially parallel to the leading edges of the baffles 10, may be introduced as shown in FIG. 6. As shown in FIG. 3 such guide plates may show a slope with respect to the end surface of the assembly 1. In particular, these guide plates may be attached to the baffles. As shown in FIGS. 3 and 6, these guide plates 14 do not extend further than the comb-shaped plate 12; it is, however, also possible to extend these plates beyond plate 12.

As is evident from FIG. 3, the plate 12 does not extend up to the wall of container 4 in order to provide a passage to the collecting chamber 8 for a component which precipitates in chamber 6. Furthermore, the edges of the teeth of plate 12 may be provided with slanting edge strips 15, as shown in FIG. 7, by means of which the sediment flowing downward along the plates 10 is forced towards the baffles 10 in order to suppress spreading of this sediment flow, and thus reducing the tendency for re-mixing through turbulence. Moreover, these strips 15 suppress upward liquid flows which might lead to disturbance of the separation. In the case of upwardly floating components, similar accessories may be applied, which are then, naturally, directed in the opposite direction.

In the case of a light component which is supplied into the chamber 7, difficulties may be encountered when the liquid to be treated is supplied transversely to the plates 9, e.g., by means of a transverse duct. It is usual to supply the liquid by means of a weir delimiting the chamber 7 at one side, but then the layer of the separated component floating on the liquid surface is disturbed and remixing with the liquid is rather probable. When, on the other hand, the weir is left out, the floating component will spread into the supply duct, and the baffles extending into the supply flow will cause turbulence as the flow direction is changed rather abruptly by these baffles.

FIG. 8 shows a slotted baffle 16 according to the invention, comprising a plate-like element which prevents the transverse flow from being abruptly turned inwardly by the edges of the guiding baffles 9. Although such a slotted baffle restricts the effective flow cross-section, such a restriction is acceptable if the distance of this slotted baffle from the adjacent end of the assembly 1 is sufficiently large so that a uniform flow completely fills the cross-section at the entry of the assembly 1.

If the supply is made by means of a transverse duct 17 (FIG. 8), the upper side of the slotted baffle 16 may extend above the normal level of the liquid in this duct 17 and the chamber 7, whereas the upper end of the slots 18 of baffle 16, which generally extend substantially vertically, do not extend as far as the upper surface of the liquid upon which the separated component is floating.

FIG. 9A shows a section through the vertical slots 18 of the baffle 16 of FIG. 8. It is also possible to use horizontal or slanting slots 18. FIG. 9B shows a modified embodiment comprising two slotted baffles 16 and 16', the slots 18 of which are substantially parallel but staggered as shown, thus providing labyrinth passages for improving the uniformity of the flow distribution at the entry of the separation assembly 1.

FIG. 10 shows another manner of supplying the liquid to be treated, comprising a transverse pipe 20 extending into a chamber 17', which is separated from the chamber 7 by a slotted baffle 16. At its upper side, this pipe 20 is provided with a longitudinal slot 21, which is preferably wedge-shaped as shown in FIG. 11, in order to obtain a substantially uniform distribution along the whole length of pipe 20. For improving the uniformity of the flow a guiding plate 22 may be provided forcing the flow, backwards and upwards. Plate 22 may be mounted on pivots 23 so as to be self-adjusting.

Within the scope of the invention many modifications are possible. For instance baffles 9 and 10 may be positioned obliquely when the tops and valleys are not superposed or positioned one above the other in alignment. The corrugated plates may be replaced by corresponding troughs and sometimes even by smooth plates.

I claim:

1. A device for separating relatively light, such as floating components, and relatively heavy, such as precipitating components, from a liquid comprising: a plurality of corrugated plates, arranged in downward sloping relation with corrugation tops and valleys of the plates extending parallel to each other and in the direction of the downward slope, the plates being arranged spaced-apart transverse to the slope, the valleys and tops respectively defining downward sloping channels separated by ridges, the valleys and the tops of the plates being vertically aligned, each plate having upper and lower ends defined by edges having the alternating corrugation tops and valleys as wave-like contours extending along a horizontal, transversely to said direction; a plurality of vertically extending baffles placed side by side and in horizontally spaced-apart relation, the baffles being arranged outside of the space between the plates and being disposed adjacent to the edges of the plates of the plurality and at least at one end of the plates and in edge face-to-edge abutment therewith; the baffle plates of the plurality as disposed at the one end being respectively situated in the edge-to-edge arrangement adjacent similar phase points of the wave-like corrugation contours; and a comb-shaped plate, the teeth of which are situated at the discharge end of a component as separated from the liquid, and symmetrically between the guide baffles, the teeth extending toward one of the plate edges with corrugated contour.

2. The device according to claim 1, characterized by guide plates parallel to the leading edges of the baffles and connecting with the extremities of the interstices between the teeth of the comb-shaped plate.

3. The device according to claim 1 characterized in that these guide plates are attached to the leading edges of the baffles.

4. The device according to claim 1 characterized by slanting guide strips to the side edges of the teeth of the comb-shaped plate.

5. The device according to claim 1 having slanting guide strips attached to the side edges of the teeth of said comb-shaped plate, there being two such strips per tooth, one on each long side, the strips being arranged in a mutual inclination to diverge in the direction of flow of the separated component along the baffles.

6. Apparatus for separating floating or sedimentable components from a liquid comprising
   a plurality of corrugated sheets arranged on a slope, but in parallel, spaced relation to one another such that the corrugated edges thereof are aligned in upper and lower common planes,
   a first plurality of substantially flat baffles arranged in edge-to-edge abutment with the upper corrugated edges of said corrugated sheets,
   a second plurality of substantially flat baffles arranged in edge-to-edge abutment with the lower corrugated edges of said corrugated sheets, and
   third baffle means arranged substantially transverse to said first baffle means on the side thereof opposite said corrugated sheets, having
     a plurality of slots therein which extend toward, but not up to, the upper surface of a liquid to be passed through said apparatus.

7. The apparatus of claim 6 including
   a comb-shaped plate, the teeth of which extend between the baffles of said second plurality and engage with at least one of said corrugated sheets at the lower edge thereof.

8. The apparatus of claim 6 wherein
   at least one of said plurality of first and second baffles is in such edge-to-edge contact with said sheets in the curve of the crests thereof.

9. The apparatus of claim 6 wherein
   at least one of said plurality of first and second baffles is in such edge-to-edge contact with said sheets in the curve of the valleys thereof.

10. The apparatus of claim 6 wherein at least one of said plurality of first and second baffles is in such edge-to-edge contact with said sheets intermediate the crests and valleys of the corrugations thereof.

11. The apparatus of claim 6 wherein said corrugated sheets have crests which are of different width than the valleys.

12. A device for separating relatively light, such as floating components, and relatively heavy, such as precipitating components, from a liquid comprising: a plurality of corrugated plates, arranged in downward sloping relation with corrugation tops and valleys of the plates extending parallel to each other and in the direction of the downward slope, the plates being arranged spaced-apart transverse to the slope, the valleys and tops respectively defining downward sloping channels separated by ridges, the valleys and the tops of the plates being vertically aligned, each plate having upper and lower ends defined by edges having the alternating corrugation tops and valleys as wave-like contours extending along a horizontal, transversely to said direction; a plurality of vertically extending baffles placed side by side and in horizontally spaced-apart relation, the baffles being arranged outside of the space between the plates and being disposed adjacent to the edges of the plates of the plurality and at least at the upper end of the plates and in edge face-to-edge abutment therewith; the baffle plates of the plurality as disposed at the upper end being respectively situated in the edge-to-edge arrangement adjacent similar phase points of the wave-like corregation contours; and said plurality of baffle means including an open end spaced from the end of said plates and forming a plurality of open channels between adjacent pairs of parallel baffle means such that fluid may flow substantially unobstructed through said channels to and from the spaces between said plurality of plates.

13. The device of claim 12 including comb-shaped plate means having
    a plurality of teeth thereon extending between said baffle means toward at least one of said corrugated plates.

14. The device of claim 13 wherein said baffle means and said comb-shaped plate means are located adjacent the lower end of said plurality of corrugated plates.

15. The device of claim 12 wherein said baffle means are positioned adjacent each the upper and lower end of said plurality of corrugated plates.

16. The device of claim 15 wherein the ends of said plates terminate in a common plane and further including second baffle means located near one of the common planes at the ends of said plurality of corrugated plates and having
a plurality of substantially vertically oriented slots therein adjacent one edge of said baffle means.

17. The device of claim 16 including third baffle means located near said second baffle means on the side thereof opposite said baffle means and having
a plurality of substantially vertically oriented slots therein so located as to be offset from said plurality of slots in said second baffle means.

18. The apparatus of claim 12 further including second baffle means arranged substantially perpendicular to said baffle means on the side thereof opposite said plurality of plates and having
a plurality of slots therein extending toward a position near, but below the upper surface of a liquid passed through said apparatus.

19. The apparatus of claim 18 wherein said second baffle means comprises
a plurality of plate-like elements extending substantially perpendicular to the general direction of flow of a liquid passed through said apparatus, each having such a plurality of said slots therein arranged so that the slots in one of said plate-like elements are offset from the slots in an adjacent plate-like element.

20. The apparatus of claim 18 including comb-shaped plate means located near a plurality of said baffle means which are located at the lower edges of said plurality of plates and having
a plurality of tooth-like members thereon, separated by slots, which extend into spaces between said first means such that said baffle means extend into the slots on said comb-shaped plate means.

21. The apparatus of claim 12 including comb-shaped plate means located near a plurality of said baffle means which are located at the lower edges of said plurality of plates and having
a plurality of tooth-like members thereon, separated by slots, which extend into spaces between said first means such that said baffle means extend into the slots on said comb-shaped plate means.

22. An apparatus as set forth in claim 12 further including slotted baffle means supported in spaced relation to said baffle means at the upper end of said plates such that the liquid flows through said slotted baffles and through said plurality of said baffle means.

* * * * *